United States Patent
Valinia et al.

(10) Patent No.: US 11,208,217 B1
(45) Date of Patent: Dec. 28, 2021

(54) SMALLSAT PLATFORM WITH STANDARD INTERFACES

(71) Applicant: United States of America as represented by the Administrator of NASA, Washington, DC (US)

(72) Inventors: Azita Valinia, Greenbelt, MD (US); Irving Burt, Greenbelt, MD (US); Bruce Pham, Greenbelt, MD (US); Opher Ganel, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 85 days.

(21) Appl. No.: 16/835,366

(22) Filed: Mar. 31, 2020

Related U.S. Application Data

(60) Provisional application No. 62/830,804, filed on Apr. 8, 2019.

(51) Int. Cl.
*B64G 1/10* (2006.01)
*B64G 1/42* (2006.01)
*B64G 1/64* (2006.01)

(52) U.S. Cl.
CPC .............. *B64G 1/10* (2013.01); *B64G 1/428* (2013.01); *B64G 1/641* (2013.01)

(58) Field of Classification Search
CPC ........... B64G 1/10; B64G 1/428; B64G 1/641
See application file for complete search history.

(56) References Cited

U.S. PATENT DOCUMENTS

| | | | | |
|---|---|---|---|---|
| 9,394,064 B2 * | 7/2016 | Arulf | ...................... | B32B 37/02 |
| 10,536,107 B1 * | 1/2020 | Ning | ........................ | B64G 1/44 |
| 10,589,879 B2 * | 3/2020 | Baldwin | ................ | B64G 1/645 |
| 2006/0016928 A1 * | 1/2006 | Thomas | ................. | B64G 1/641 |
| | | | | 244/10 |
| 2013/0221162 A1 * | 8/2013 | Darooka | .................. | B64G 1/10 |
| | | | | 244/173.1 |
| 2015/0151855 A1 * | 6/2015 | Richards | .................. | B64G 1/10 |
| | | | | 244/164 |
| 2018/0251241 A1 * | 9/2018 | Burt | ......................... | B64G 1/50 |
| 2019/0161215 A1 * | 5/2019 | Cosner | ..................... | B64G 1/10 |
| 2021/0122502 A1 * | 4/2021 | Kokorich | .............. | B64G 1/648 |

* cited by examiner

*Primary Examiner* — Valentina Xavier
(74) *Attorney, Agent, or Firm* — Christopher O. Edwards; Bryan A. Geurts; Helen M. Galus

(57) ABSTRACT

In at least one aspect, a small satellite includes a cylindrical body, a predetermined payload volume, a payload adapter ring mechanical interface for interchangeably mechanically coupling to a launch vehicle payload adapter ring, an electrical interface specifying a set of electrical specifications for interchangeably electrically coupling to the launch vehicle payload adapter ring, a specified center of gravity location and specified frequency response, where the predetermined payload volume, payload adapter ring mechanical interface, electrical interface, specified center of gravity location, and frequency response range allow the small satellite to be interchanged with other small satellites when coupling to the launch vehicle.

20 Claims, 3 Drawing Sheets

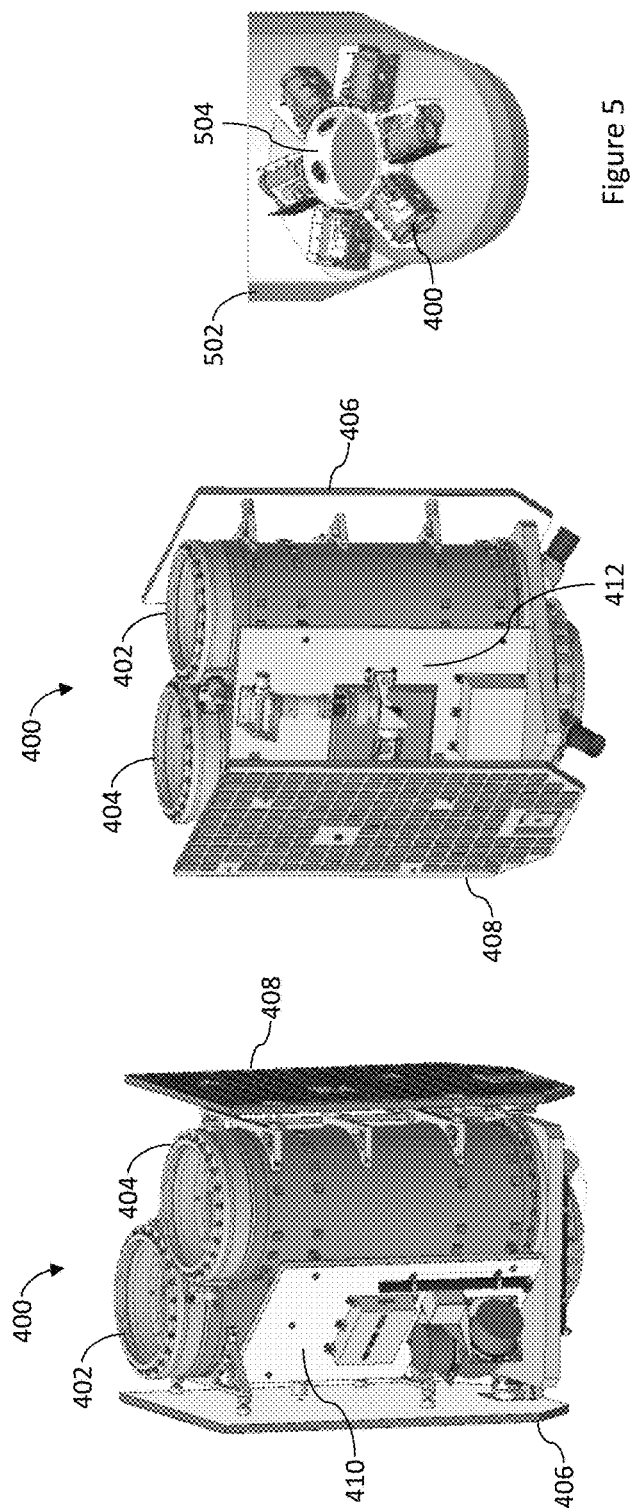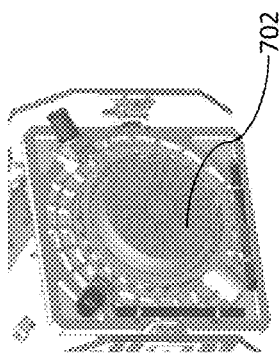

SMALLSAT PLATFORM WITH STANDARD INTERFACES

ORIGIN OF THE INVENTION

Invention by Government Employee(s) Only

The invention described herein was made by one or more employees of the United States Government, and may be manufactured and used by or for the Government for governmental purposes without the payment of any royalties thereon or therefor.

FIELD

The present disclosure relates to a SmallSat platform, in particular to a SmallSat platform with an optionally pressurized volume and a standard set of interfaces.

BACKGROUND

The term SmallSat generally refers to satellites having a relatively small size and low mass, typically under 500 kg. Over the past decade, efforts have been made to decrease the cost of spacecraft development and make space accessible to a larger population having more limited resources. Space agencies, defense agencies, and commercial enterprises are now considering innovative uses of disaggregated constellations of smaller satellites to accomplish, at lower cost and more rapid turnaround, the same objectives previously achievable only with large single satellites, with their remarkably high costs and long lead times. Over the past decade, the use of SmallSats has resulted in decreased costs of development of applications and space craft themselves, providing increased opportunities for scientific exploration and commercialization of space for industry, scientists, entrepreneurs, educators, students, and the general public. The use of disaggregated constellations of smaller satellites, mentioned above, are particularly powerful when they are deployed in applications that require multi-point distributed observations from space, for example, global science measurements of the Earth systems and weather.

It would be advantageous to provide a platform that provides affordable SmallSat constellations for scientific exploration, commercial, and defense applications.

SUMMARY

In at least one aspect, the disclosed embodiments are directed to a small satellite including a cylindrical body, a predetermined payload volume, a payload adapter ring mechanical interface for interchangeably mechanically coupling to a launch vehicle payload adapter ring, an electrical interface specifying a set of electrical specifications for interchangeably electrically coupling to the launch vehicle payload adapter ring, a specified center of gravity location and specified mechanical frequency response, wherein the predetermined payload volume, payload adapter ring mechanical interface, electrical interface, specified center of gravity location, and mechanical frequency response range allow the small satellite to be interchanged with other small satellites when coupling to the launch vehicle.

In at least another aspect a method of providing a small satellite includes constructing a cylindrical body to enclose a predetermined payload volume, attaching a payload adapter ring mechanical interface to the cylindrical body for interchangeably mechanically coupling to a launch vehicle payload adapter ring, providing an electrical interface complying with a set of electrical specifications for interchangeably electrically coupling to the launch vehicle payload adapter ring, weighting the small satellite to achieve a specified center of gravity location and specified mechanical frequency response, and utilizing the predetermined payload volume, payload adapter ring mechanical interface, electrical interface, specified center of gravity location, and mechanical frequency response range to interchange the small satellite with other small satellites when coupling to the launch vehicle.

In at least one additional aspect, the disclosed embodiments are directed to a type of small satellite with a cylindrical body having a diameter larger than its height, referred to as a Capsulation Satellite (CapSat) instrument puck configuration, configured to interface to an Evolved Expendable Launch Vehicle Secondary Payload Adaptor (ESPA) Grande ring.

In at least one other aspect, the disclosed embodiments are directed to a type of small satellite with a cylindrical body having a height larger than its diameter, referred to as a CapSat instrument tube configuration, configured to interface to a standard ESPA ring.

BRIEF DESCRIPTION OF THE DRAWINGS

FIG. 4A shows a first view of an exemplary embodiment of a CapSat instrument tube configuration;

FIG. 4B shows a second view of an exemplary embodiment of a CapSat instrument tube configuration;

FIG. 5 shows exemplary CapSat instrument tube configurations attached to a standard ESPA ring;

FIG. 6 shows a top view of the CapSat instrument tube configuration;

FIG. 7 shows a bottom view of the CapSat instrument tube configuration; and

DETAILED DESCRIPTION

The disclosed embodiments are generally directed to a modularized, pressurizable, thermally controlled spacecraft designed to host ruggedized commercial off the shelf (COTS) instrumentation in a terrestrial-like environment on orbit. The modularity provides predefined payload volume dimensions and a predefined set of support functions, for example, a battery and a set of solar arrays for power, a communications package, a spacecraft electronics package, flight system software, and ground system software.

The spacecraft may include a pressurizable volume for both spacecraft and payload systems which may provide multiple benefits, primarily in thermal design. Maintaining approximately one atmosphere of pressure inside the CapSat instrument puck configuration and the CapSat instrument tube configuration, allows for the use of materials that might otherwise outgas, fail, or cause significant contamination issues in low pressure environments. This also allows for the use of certain vibration-absorbing materials and designs on orbit that are found in terrestrial COTS hardware on orbit. The pressurizable volume may have a temperature control capability that may be implemented in at least one example by, upon deployment in space, orienting the spacecraft such that a first peripheral surface faces the sun and an opposite peripheral surface faces away from the sun. Insulation and air circulation may be provided to maintain the pressurizable volume at a particular temperature, such as between 20-24° C. In some embodiments, the temperature control may be capable of maintaining a precise, specific temperature, for example, 20° C. The pressurization, temperature control, or both may advantageously allow for the use of equipment and instruments within the pressurizable volume that would otherwise require extensive qualification for thermal excursions, vacuum, radiation, and other qualifications of use in space. As a result, components may not have to be redesigned for thermal requirements, may not require conformal coating, may not require contamination bake-out, or other measures that may be required for operating outside of the instrument puck and instrument tube embodiments in space.

Figure 1:
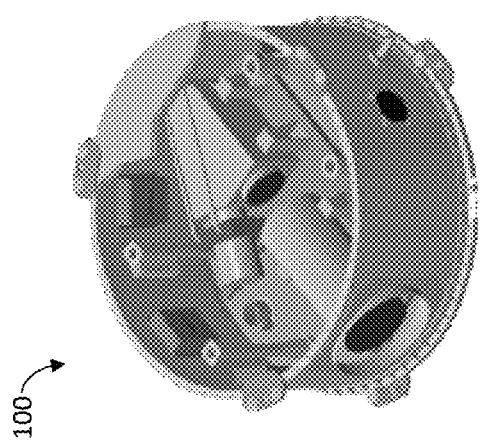
FIG. 1 shows an exemplary embodiment of a CapSat instrument puck configuration.

FIG. 1 shows an exemplary embodiment of a CapSat instrument puck configuration 100. In some embodiments, the instrument puck configuration may measure approximately 1 meter in diameter and approximately 0.5 meters in height, providing an instrument volume of approximately 392 U, where a U is 10 cm$^3$, and may be capable of holding a payload of approximately 100 kg and approximately 100 W.

Figure 2:
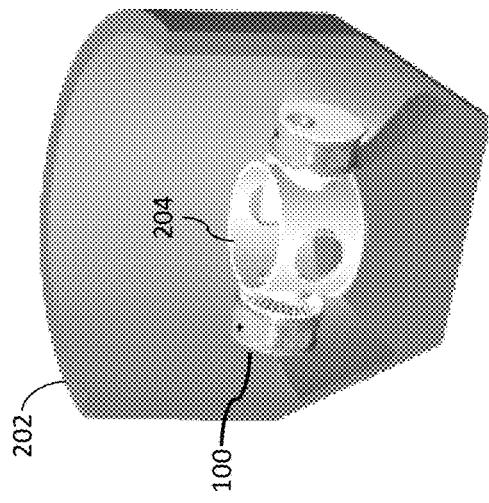
FIG. 2 shows exemplary CapSat instrument puck configurations attached to an ESPA Grande ring.

As shown in a stowed view in FIG. 2, the CapSat instrument puck configuration 100 may fly within a launch vehicle payload fairing 202 and may include a mechanical and electrical interface to an ESPA Grande ring 204 having approximately up to a 700-kilogram capability per attachment point with 4 or 5 attachment points per ring.

Figure 3:
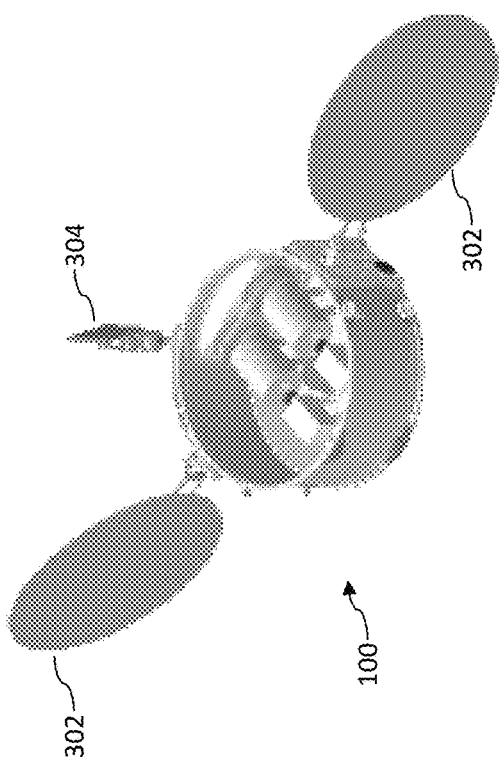
FIG. 3 shows an exemplary CapSat instrument puck configuration deployed in space.

The CapSat instrument puck configuration 100, shown as deployed in FIG. 3, may include two solar arrays 302, for example, 0.78 Sq m solar arrays capable of producing 138 W each for a total of 276 W and a low earth orbit average power of approximately 135 W. The CapSat instrument puck configuration 100 may also include a phased array high gain antenna 304 which may be capable of producing X-band downlink data rates in excess of 400 Mbps.

The flight system software may include the NASA core Flight System (cFS) which includes a dynamic run-time environment, layered software, and a component based design. To support reuse and project independence, the architecture contains a configurable set of requirements and code. The configurable parameters allow the cFS to be tailored for each environment including desk-top and closed loop simulation environments. Science and mission software can be developed and functionally tested very early in the project and well before any project hardware is even available. The architecture includes a reusable test suite and reusable artifacts including requirements, design documentation, test procedures and results, development standards, and user guides. The cFS architecture also simplifies the flight software maintenance process by providing the ability to change software components during development or in flight without having to restart or reboot the system.

The ground system software may include the NASA Integrated Test and Operations System (ITOS) which has code for processing, analyzing, and displaying spacecraft component telemetry, for generating commands, and for performing automated operations and testing. ITOS is generally configured through a telemetry and command database which defines telemetry data points, provides information or extracting data from a telemetry stream, and provides for defining telemetry alarm limits. ITOS supports a wide variety of transport protocols which makes ITOS advantageously able to communicate directly with the spacecraft component under test and able to support file transfers to and from the spacecraft.

FIGS. 4A and 4B show different views of an exemplary embodiment of a CapSat instrument tube configuration 400. In some embodiments, the instrument tube configuration 400 may include one or more tubes 402, 404, each measuring approximately 30 cm diameter and 60 cm in height, providing an instrument volume of approximately 53U, and may be capable of holding a payload of approximately 17.5 kg and approximately 20 W. Some CapSat instrument tube configurations may include a pair of tubes 402, 404 which provide an instrument volume of approximately 106U, and may be capable of holding a payload of approximately 35 kg and approximately 40 W. The CapSat instrument tube configuration 400 may include solar arrays 406, 408 and external component panels 410, 412 for deploying the solar arrays and performing other functions.

As shown in a stowed view in FIG. 5, the CapSat instrument tube configuration 400 may fly within a launch vehicle payload fairing 502 and may include a mechanical and electrical interface to a standard ESPA ring 504 having approximately up to a 450-kilogram capability per attachment point with 6 attachment points per ring.

FIG. 6 shows a top view of the CapSat instrument tube configuration 400. At least one end of at least one tube may have a window 602 that may be transparent to radiation being detected by any instrumentation housed in the CapSat instrument tube configuration 400. In other embodiments, one or more of the tubes 402, 404 may have sealed ends.

FIG. 7 shows a bottom view of the CapSat instrument tube configuration 400. The CapSat instrument tube configuration 400 may include a pressurized volume 702 holding spacecraft electronics.

Figure 8:
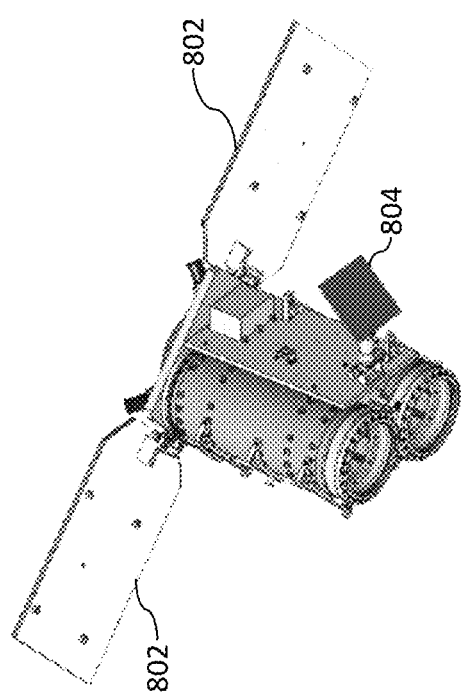
FIG. 8 shows an exemplary CapSat instrument tube configuration deployed in space.

The CapSat instrument tube configuration 400 is shown as deployed in FIG. 8. The solar arrays 406, 408 may be, for example, 0.78 Sq m solar arrays capable of producing 138 W each for a total of 276 W and a low earth orbit average power of approximately 135 W. The CapSat instrument tube configuration 400 may also include a phased array high gain antenna 804 which may be capable of producing X-band downlink data rates in excess of 400 Mbps.

The CapSat instrument tube configuration 400 may include flight system software similar to the instrument puck configuration, for example, the NASA core Flight System (cFS) described above.

The CapSat instrument tube configuration 400 may, when on the ground, utilize ground system software, for example, ITOS described above.

The pressurized volume of the disclosed embodiments of the CapSats advantageously provides a plug-and-play-type interface for instruments so that they can be readily flown on orbit. The CapSats further provide a standardized interface allowing independent development of multiple instruments that may be integrated quickly onto the standard ESPA and ESPA Grande rings. The CapSats are also fully qualified for flight independent of the launch vehicle and can optionally be fully pressurized as needed.

CapSat instrument puck and instrument tube configurations may be delivered to an instrument developer in a kit form, including mechanical and electrical instrument control documents and software to allow testing through commercial standard data interfaces. The mechanical instrument control document may specify, among other things, center of gravity location and minimum mechanical frequency responses. For example, the CapSat instrument puck and instrument tube configurations may be weighted to achieve a first fundamental frequency of approximately 88 Hz. The electrical instrument control document may specify, among other things, electromagnetic interference, electromagnetic compatibility, and in-rush current requirements. Because of form-factor interchangeability, qualified CapSat instrument puck and instrument tube configurations may be delivered or swapped out very late in the launch vehicle integration and test process, allowing instrument development to be decoupled from spacecraft build schedules. To support interchangeability without affecting coupled loads, lower-mass payloads may be "topped off" with dummy masses up to the full mass allowance.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

What is claimed is:

1. A small satellite comprising:
   a cylindrical body;
   a predetermined payload volume;
   a payload adapter ring mechanical interface for interchangeably mechanically coupling to a launch vehicle payload adapter ring;
   an electrical interface specifying a set of electrical specifications for interchangeably electrically coupling to the launch vehicle payload adapter ring;
   a specified center of gravity location and specified mechanical frequency response;
   wherein the predetermined payload volume, payload adapter ring mechanical interface, electrical interface, specified center of gravity location, and mechanical frequency response range allow the small satellite to be interchanged with other small satellites when coupling to the launch vehicle.

2. The small satellite of claim 1, wherein a diameter of the cylindrical body is larger than a height.

3. The small satellite of claim 2, wherein the payload volume is approximately 392 U, where a U is 10 cm$^3$.

4. The small satellite of claim 2, wherein the launch vehicle payload adapter ring is an Evolved Expendable Launch Vehicle Secondary Payload Adaptor Grande ring.

5. The small satellite of claim 2, configured to hold a payload of approximately 100 kg and approximately 100 W.

6. The small satellite of claim 1, wherein a height of the cylindrical body is larger than a diameter.

7. The small satellite of claim 5, wherein the payload volume is approximately 53 U, where a U is 10 cm$^3$.

8. The small satellite of claim 5, wherein the launch vehicle payload adapter ring is a standard Evolved Expendable Launch Vehicle Secondary Payload Adaptor ring.

9. The small satellite of claim 5, configured to hold a payload of approximately 17.5 kg and approximately 20 W.

10. The small satellite of claim 1, wherein the specified mechanical frequency response is approximately 88 Hz.

11. A method of providing a small satellite comprising:
    constructing a cylindrical body to enclose a predetermined payload volume;
    attaching a payload adapter ring mechanical interface to the cylindrical body for interchangeably mechanically coupling to a launch vehicle payload adapter ring;
    providing an electrical interface complying with a set of electrical specifications for interchangeably electrically coupling to the launch vehicle payload adapter ring;
    weighting the small satellite to achieve a specified center of gravity location and specified frequency response;
    utilizing the predetermined payload volume, payload adapter ring mechanical interface, electrical interface, specified center of gravity location, and frequency response range to interchange the small satellite with other small satellites when coupling to the launch vehicle.

12. The method of claim 11, wherein a diameter of the cylindrical body is larger than a height.

13. The method of claim 12, wherein the payload volume is approximately 392 U, where a U is 10 cm$^3$.

14. The method of claim 12, wherein the launch vehicle payload adapter ring is an Evolved Expendable Launch Vehicle Secondary Payload Adaptor Grande ring.

15. The method of claim 12, comprising configuring the cylindrical body to hold a payload of approximately 100 kg and approximately 100 W.

16. The method of claim 11, wherein a height of the cylindrical body is larger than a diameter.

17. The method of claim 16, wherein the payload volume is approximately 53 U, where a U is 10 cm$^3$.

18. The method of claim 16, wherein the launch vehicle payload adapter ring is a standard Evolved Expendable Launch Vehicle Secondary Payload Adaptor ring.

19. The method of claim 16, comprising configuring the cylindrical body to hold a payload of approximately 17.5 kg and approximately 20 W.

20. The method of claim 11, wherein the specified frequency response is approximately 88 Hz.

* * * * *